(12) United States Patent
Quinlan

(10) Patent No.: US 9,954,834 B2
(45) Date of Patent: Apr. 24, 2018

(54) METHOD OF OPERATING A COMPUTING DEVICE, COMPUTING DEVICE AND COMPUTER PROGRAM

(71) Applicant: BlackBerry Limited, Waterloo (CA)

(72) Inventor: Sean Michael Quinlan, Duvall, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/097,170

(22) Filed: Apr. 12, 2016

(65) Prior Publication Data
US 2016/0308845 A1    Oct. 20, 2016

Related U.S. Application Data

(60) Provisional application No. 62/147,933, filed on Apr. 15, 2015.

(51) Int. Cl.
*H04L 29/06*     (2006.01)
*H04L 9/32*      (2006.01)
*G06F 21/00*     (2013.01)

(52) U.S. Cl.
CPC ............ *H04L 63/061* (2013.01); *G06F 21/00* (2013.01); *H04L 9/3247* (2013.01); *H04L 63/0853* (2013.01); *H04L 63/045* (2013.01)

(58) Field of Classification Search
None
See application file for complete search history.

(56) References Cited

U.S. PATENT DOCUMENTS

| | | | |
|---|---|---|---|
| 7,302,570 B2 | 11/2007 | Beard et al. | |
| 9,111,105 B2* | 8/2015 | Barton | H04L 41/00 |
| 9,325,499 B1* | 4/2016 | Juels | H04L 9/30 |
| 2007/0014403 A1 | 1/2007 | Loo et al. | |
| 2007/0058808 A1 | 3/2007 | Rudolf et al. | |
| 2007/0237332 A1 | 10/2007 | Lyle et al. | |
| 2007/0250904 A1* | 10/2007 | Waller | G06F 21/6245 726/1 |
| 2009/0249492 A1 | 10/2009 | Boesgaard Sorensen | |
| 2009/0259850 A1 | 10/2009 | Ishibashi | |

(Continued)

OTHER PUBLICATIONS

International Search Report and Written Opinion issued in International Application No. PCT/US2016/027149 dated Jul. 18, 2016.

(Continued)

*Primary Examiner* — Kaveh Abrishamkar
(74) *Attorney, Agent, or Firm* — Fish & Richardson P.C.

(57) ABSTRACT

A computing device has a first application and a second application. The first application generates a data access application key for use by the second application to enable decryption of data that is stored in encrypted form on the computing device using the data access application key. In operation, the second application generates a public/private key pair. The second application sends a request to the first application for the first application to send the second application a data access application key, the request including the public key. The first application derives the requested data access application key as a function of at least the public key. The first application sends the derived data access application key to the second application.

30 Claims, 6 Drawing Sheets

(56) References Cited

U.S. PATENT DOCUMENTS

| | | |
|---|---|---|
| 2010/0235624 A1 | 9/2010 | Candelore |
| 2012/0084806 A1 | 4/2012 | Fahrny et al. |
| 2012/0159147 A1 | 6/2012 | Ando |
| 2013/0227280 A1 | 8/2013 | Quinlan et al. |
| 2014/0082358 A1 | 3/2014 | Nakhjiri et al. |
| 2015/0154418 A1* | 6/2015 | Redberg ............ G06F 17/30106 713/165 |

OTHER PUBLICATIONS

International Preliminary Report on Patentability under Ch. II issued in International Application No. PCT/US2016/027149 dated Jun. 27, 2017; 4 pages.

* cited by examiner

METHOD OF OPERATING A COMPUTING DEVICE, COMPUTING DEVICE AND COMPUTER PROGRAM

CROSS REFERENCE TO RELATED APPLICATION

This application claims the benefit of U.S. Provisional Patent Application No. 62/147,933, filed on 15 Apr. 2015, the contents of which are incorporated herein by reference in their entirety.

BACKGROUND OF THE INVENTION

Field of the Invention

The present invention relates to a method of operating a computing device, a computing device and a computer program.

Description of the Related Technology

There are many situations where it is desirable or necessary to encrypt data when the data is stored and/or transmitted, principally in order to prevent unauthorized access to the data. A number of different methods and techniques for encrypting data are known. Some of these make use of a "container" concept: the data is encrypted and "wrapped" in a (digital) container for which various access policies can be applied to control which users can access the (encrypted) data within the container and under what circumstances. A container is a meta-file format whose specification describes how different data elements and metadata coexist in a computer file. The encryption key which is used to encrypt (and, correspondingly, decrypt) the data may itself be encrypted for secure storage purposes, typically in the prior art by using a user-entered password as an encryption key for that encryption.

However, one problem with encrypting data is how to generate encryption keys that are to be used to encrypt and decrypt data. This is a particular issue where there are several applications running on a computing device that require access to or store data in encrypted form. A particular example is enabling users to have a secure way of viewing and/or editing data or files in general, or carrying out other actions in respect of the data or files, including for example other manipulation, transformation, processing, storage, transmission and other computing operations. Such files may have been downloaded or received at the user device as an attachment to an email or by some other file transfer protocol or method. Since a container may contain many files, this can give rise to problems as many different types of files are typically stored and each different type of file requires different application code to view/edit/manipulate/etc., so the container application becomes larger the more different types of files it supports. It is desirable to make the encrypted file available to third party applications on the user device, such as viewers/editors/etc., though this availability must be achieved in a secure manner which does not compromise the security of the encrypted file. It is inconvenient for a user to have to enter a password each time that a particular application accesses data on a user device, but it is also preferred not to use the same encryption key for each application for security reasons.

SUMMARY

According to a first aspect of the present invention, there is provided a computing device, the computing device comprising: a first application and a second application; the first application being arranged to generate a data access application key for use by the second application to enable decryption of data that is stored in encrypted form on the computing device using said data access application key, wherein: the second application is arranged to generate a public/private key pair; the second application is arranged to send a request to the first application for the first application to send the second application a data access application key, the request including the public key; the first application is arranged to derive the requested data access application key as a function of at least the public key; and the first application is arranged to send the derived data access application key to the second application.

In examples of embodiments, this enables the first application to trust the request for the data access application key sent by the second application, without for example requiring the first application to obtain an identifier for the second application from an operating system of the computing device and without requiring the second application to send its own identifier to the first application (which typically can be easily spoofed by some other application running on the computing device).

In an embodiment, the computing device is arranged such that the request sent by the second application to the first application includes a signature which is signed with the private key.

In an embodiment, the computing device is arranged such that the first application derives the requested data access application key as a function of at least the public key and a value that is unique to the computing device.

In an embodiment, the computing device is arranged such that the first application derives the requested data access application key as a function of at least the public key and a key associated with the user of the computing device.

In an embodiment, the computing device is arranged such that the first application derives the requested data access application key as a function of at least the public key and an identifier of the first application.

In an embodiment, the computing device is arranged such that the first application derives the requested data access application key as a function of at least the public key, a value that is unique to the computing device, a key associated with the user of the computing device and an identifier of the first application.

In an embodiment, the computing device is arranged such that the second application saves the public/private key pair in a sandbox associated with the second application on the computing device.

In an embodiment, the computing device is arranged such that the data access application key is used by the second application to encrypt and decrypt a key that is used to encrypt data stored by the second application.

In an embodiment, there is provided a computer device comprising: a third application, different from the first application and the second application; wherein: the first application is arranged to generate a further data access application key for use by a third application to enable decryption of data that is stored in encrypted form on the computing device using the further data access application key; the third application is arranged to generate a further public/private key pair; the third application is arranged to send a request to the first application for the first application to send the third application the further data access application key, the request including the further public key; the first application is arranged to derive the further data access application key as a function of at least the further public key; and the first application is arranged to send the further data access application key to the third application In an embodiment the computing device is arranged to determine whether the request from the third application is pending prior to the first application sending a message comprising the derived data access application key and control data to the second application, and in the case that the request from the third application is pending: send the message comprising the derived data access application key and control data from the first application to the second application; and responsive to receipt of said message at the second application, send a message to the first application to process the pending request from the third application based on the control data.

The computing device may comprise a processing system which comprises at least one processor and at least one memory including computer program code, the at least one memory and the computer program code being configured to, with the at least one processor, cause the computing device to operate as described above.

According to a second aspect of the present invention, there is provided a method of operating a computing device, the method comprising: a first application running on the computing device generating a data access application key for use by a second application running on the computing device to enable decryption of data that is stored in encrypted form on the computing device using said data access application key, wherein: the second application generates a public/private key pair; the second application sends a request to the first application for the first application to send the second application a data access application key, the request including the public key; the first application derives the requested data access application key as a function of at least the public key; and the first application sends the derived data access application key to the second application.

According to a third aspect of the present invention, there is provided a computer program comprising code such that when the computer program is executed on a computing device comprising a first application and a second application: the first application generates a data access application key for use by the second application to enable decryption of data that is stored in encrypted form on the computing device using said data access application key, wherein: the second application generates a public/private key pair; the second application sends a request to the first application for the first application to send the second application a data access application key, the request including the public key; the first application derives the requested data access application key as a function of at least the public key; and the first application sends the derived data access application key to the second application.

According to a fourth aspect of the present invention there is provided a method, comprising configuring at least one processor and at least one memory to cause the at least one processor to: receive, at a first application installed on a user device, a first message from a second application for a first authentication response; receive, at the first application, a second message from a third application for a second authentication response; forward a response to the first request, the response comprising control data and authentication data to enable decryption of data that is stored in encrypted form on the computing device; and invoke, on the basis of data contained within a further message received from the second application, foreground processing resources in order to service the second message from the third application, wherein the data contained within the further message is directly related to said control data According to a fifth aspect of the present invention there is provided a computer program comprising a set of instructions, which, when executed by a processing system, causes the processing system to perform the method described above.

There may be provided a non-transitory computer-readable storage medium comprising a set of computer-readable instructions stored thereon, which, when executed by a processing system of a computing device, cause the computing device to carry out a method as described above.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
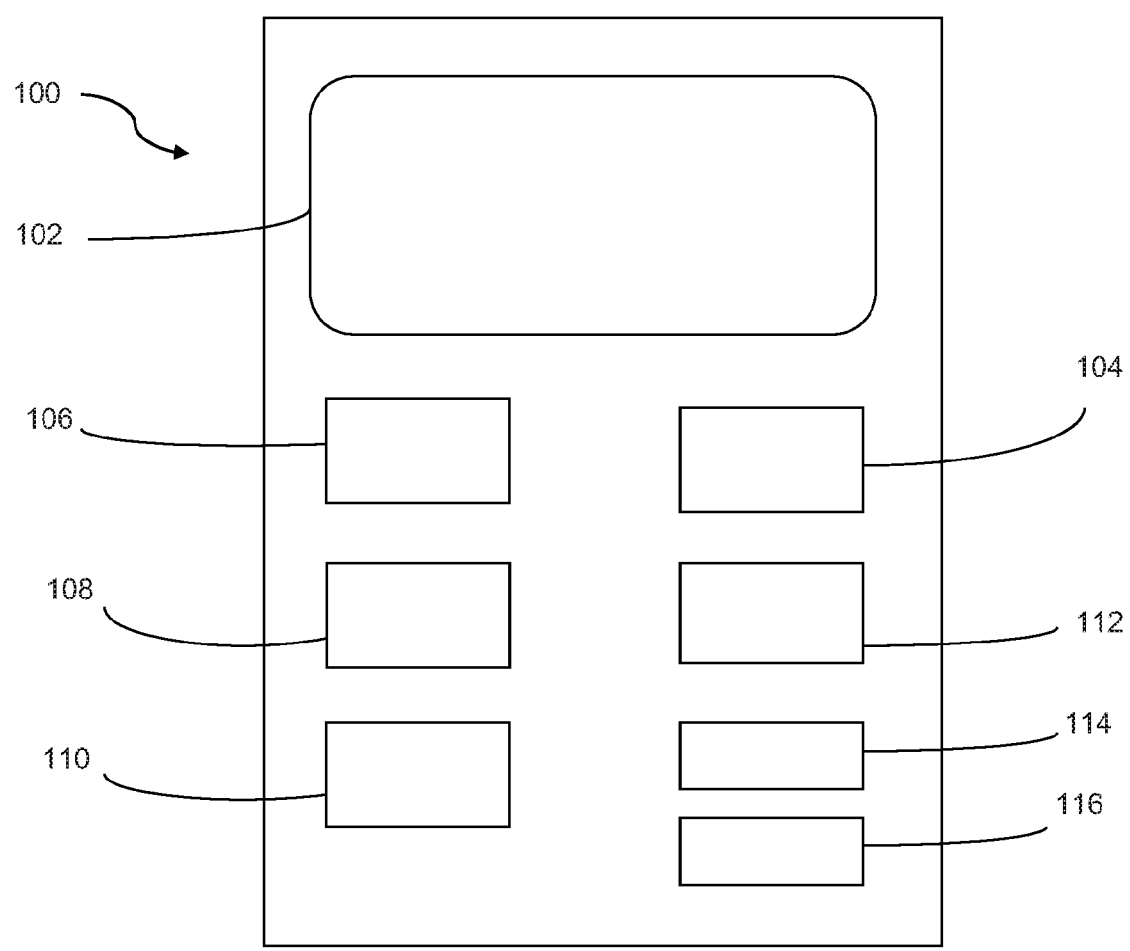
FIG. 1 shows schematically components of an example of a computing device according to and suitable for practicing embodiments of the present invention.

FIG. 1 shows schematically components of an example of a computing device 100. The example shown is a client or user device 100. A particular example is a portable computing device 100 though embodiments of the present invention are equally applicable to non-portable computing devices, including for example desktop computers, kiosk style computers, etc. In either case, for portable or non-portable computing devices, the device 100 may connect to some kind of network via wired or wireless connections or a combination of wired and wireless connections. A portable computing device 100 may take the form of a smart phone, a personal digital assistant (PDA), an e-reader, a tablet or notebook computer, etc.

The computing device 100 includes a display screen 102, which may be a touch screen which can receive user input and/or the computing device 100 may have a separate input device such as a keyboard 104 or some pointing device (not shown), which may be integral or connected wirelessly or by wired connection to the computing device 100. The computing device 100 further includes a processor 106, a non-volatile storage device 108 (such as a hard disk drive and/or non-volatile memory for example) and a random access memory (RAM) 110. The processor 106 processes instructions stored in the random access memory 110 that have been loaded from the non-volatile storage device 108. These instructions are in the form of computer software in the form of one or more programs that implement an operating system and a client program. The RAM 110 is also used by programs running on the processor 106 as a means of storing and accessing data in the form of electronic signals where the data is used during the execution of the programs. The operating system provides a file system for storing, modifying and accessing files held in the non-volatile storage device 108. This file system may be accessible to other programs running on the processor 106 via the programmatic interface provided by the operating system. Programs running on the processor 102 also process user input obtained from a user input, whether via the touch screen 102 or keyboard 104, etc. The computing device 100 also includes a network interface 112 (or a plurality of such interfaces) which allows programs running on the processor 102 to transmit and receive data to and from other devices and systems via a communications network (or a plurality of such networks), via wired and/or wireless connections.

Figure 2:
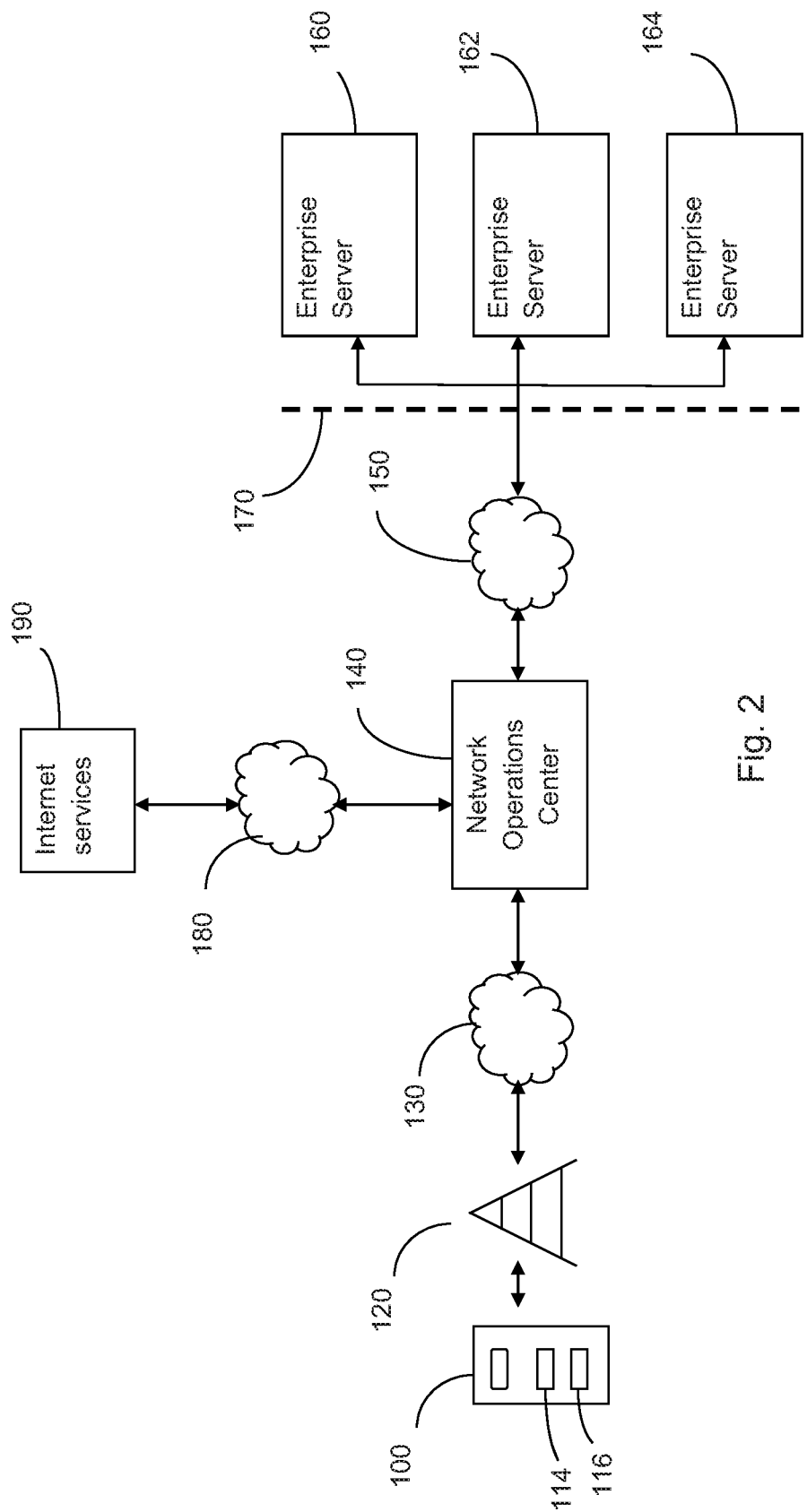
FIG. 2 shows schematically an example of network components and devices for embodiments of the present invention.

Examples of communication links which may be made by the computing device 100 using the network interface 112 are shown schematically in FIG. 2. The network interface 112 may include a radio access network interface which is able to communicate with a wireless access node 120, such as a base station or a wireless access point, which provides access to a communications network 130. The network interface 112 may be able to connect to the wireless access node 120 using one or more of a number of radio access technologies, including for example Global System for Mobile Communications (GSM), Universal Mobile Telecommunications System (UMTS), Long Term Evolution (LTE), and fixed wireless access (such as IEEE 802.16 WiMax), and wireless networking (such as IEEE 802.11 WiFi). Alternatively or additionally, the network interface 112 may provide for wired connections to the communications network 130, such as via a modem or router or the like. The communications network 130 may be or include the Internet and/or a public land mobile network (PLMN) and/or a public switched telephone network (PSTN).

The computing client device 100 may include a networking program that allows communication between programs running on the processor 106 and external apparatus via the communications network 130. External devices which can be communicated with via the communications network 130 may include a remote data processing device apparatus such as a Network Operations Center (NOC) 140. The NOC 140 may be a computer server or a plurality of computer servers which can communicate via a communications network 150 with other remote data processing devices, such as one or more enterprise servers 160, 162, 164 which are connected to an enterprise network (not shown). The communications network 150 may for example be or include the Internet, a PLMN, a PSTN, etc. General access to the one or more enterprise servers 160, 162, 164 and the enterprise network from the communications network 150 may typically be prevented by a firewall 170 placed between the communications network 150 and the enterprise network such that all network traffic that passes between the communications network 150 and the enterprise network can be monitored and (optionally) discarded if it does not satisfy criteria enforced by the firewall 170. For example the firewall 170 may be configured to only allow network connections between the NOC 140 and one or more enterprise servers 160, 162, 164, and to discard all other network connections from the communications network 150 to the one or more enterprise servers 160, 162, 164 and/or the enterprise network.

In order to access content and services provided by remote data processing devices such as the NOC 140 and one or more enterprise servers 160, 162, 164, a user of the computing device 100 may use a client program 114 on the computing device 100. The client program 114 may for example be pre-loaded onto the computing device 100 before purchase of the computing device 100 by the user or downloaded and installed onto the computing device 100 by the user subsequently. The one or more enterprise servers 160, 162, 164 may provide access to enterprise services including enterprise email services for storing, sending and receiving email; enterprise file sharing services for storing and retrieving files; enterprise database services for accessing and modifying an enterprise database (or databases); enterprise personal information management (PIM) services for accessing and modifying personal information such as contact lists, calendars, task lists; and other services including enterprise resource planning, customer relationship management, field/support force automation, consumer data content storage, etc. Each of these services may be provided by the one or more enterprise servers 160, 162, 164 and/or by one or more other servers within the enterprise network to which the one or more enterprise servers 160, 162, 164 may connect in order to provide access to those services. In order to access these services, the user of the client program 114 is first identified and authenticated by the NOC 140 and/or one or more enterprise servers 160, 162, 164, by the user entering some identification and authentication details. Once the user has entered the identification and authentication details, they may be transmitted from the computing device 100 to the NOC 140 over a secure (e.g. encrypted) data connection established over the (relatively insecure) communications network 130. Once the user has been identified and authenticated by the NOC 140, the client program 114 may maintain a data connection between it and the NOC 140 in order to allow communication between the client program 114 and the NOC 140. This data connection may be a secure connection over the data communications network 130 and allows data to be sent between the computing device 100 and the one or more enterprise servers 160, 162, 164. Thus the NOC 140 may act as a relay between the client program 114 and the one or more enterprise servers 160, 162, 164 and assists in ensuring secure transfer of data between the computing device 100 and the one or more enterprise servers 160, 162, 164. The data connection between the client program 114 and the NOC 140 may also be used to "push" information received from the one or more enterprise servers 160, 162, 164 to applications running on the computing device 100. The network interface of the NOC 140 may also allow the NOC 140 to communicate via a communications network 180 (including for example the Internet) with other remote data processing devices such as one or more third party computer servers 190 that provide other services. It should be noted that whilst much of the above is in terms of "enterprise" servers providing enterprise services for users, embodiments of the present invention are widely applicable to many scenarios where a user or client device 100 connects to some remote data store or other server over a network. Moreover, in addition, the client device 100 can connect directly to third party computer servers 190 without having to connect via the NOC 140, again via wired or wireless or a combination of wired and wireless connections, including for example via the Internet.

At least some of the data stored on the computing device 100, such as data that is obtained via the NOC 140, is stored in secure, encrypted form. As mentioned above, a number of different methods and techniques for encrypting data are known. In the present example, the encryption makes use of a (digital) container in which the data is encrypted and "wrapped" in a container for which various access policies can be applied to control which users can access the (encrypted) data within the container. The access policies can for example be determined, and varied if desired, by a remote user, such as an administrator of the one or more enterprise servers 160, 162, 164. Changes to the access policies can be communicated to the computing device 100 via the NOC 140.

Typically, the computing device 100 will include one or more programs or applications 116 that allow various actions to be carried out in respect of the data or files on the computing device 100, including for example viewing, editing, other manipulation, transformation, processing, storage, transmission and other computing operations. For brevity, a particular example is that of the computing device 100 comprising one or more secure viewer/editor applications 116 which can be used to view and/or edit data that is stored in secure form on the computing device 100, the data typically being stored in the form of computer files. It will be understood however that this is only one specific example of an application 116 that carries out actions in respect of data or files on the computing device 100 and that aspects of the present invention are applicable broadly to other such applications. In general terms, in one example, this operates as follows. It should be noted that there may in practice be several different secure viewer/editor or other applications installed on the computing device 100. However, again for simplicity, the following description will principally be in respect of there being just one secure viewer/editor or other file/data access application 116.

As discussed further below, the application 116 obtains a file or data access application key from the client program 114 running on the computing device 100 in order to be able to unlock files stored in encrypted form in secure storage on the computing device 100 for that application 116. The client program 114 may be for example an application whose container should be used by other applications, which are hosted within other containers on the same device, as an authentication delegate for those other applications, and may be specified as such by for example the administrator of the one or more enterprise servers 160, 162, 164. Using the client program 114 as an authentication delegate for the other applications avoids the user having to enter a password each time one of the other applications wants to access a file or data stored in encrypted form in a container on the computing device 100.

Requests and other messages passed from the client program 114 to the application 116 are authenticated as originating from the client program 114. Conversely, requests and other messages passed from the application 116 to the client program 114 are authenticated as originating from a supported secure viewer/editor application. These authentications may be based, at least in part, on some identifier of the requesting application or program that is sending the request. Moreover, inter-container communications between the client program 114 and the application 116 may be encrypted for security purposes, for example to stop some "eavesdropping" application which may be running on the computing device 100 being able to intercept and interpret the communications. (Such an eavesdropping application may be a legitimate function of the operating system of the device, but is nevertheless undesirable in this context where security of the data is paramount.)

The application 116, rather than prompting the user directly for a client password to allow it to generate a key to access encrypted files or data, preferably relies on the client program 114 to authenticate the local user, the client program 114 in effect acting as an authentication delegate for the application 116. This "single-sign-on" element allows the user to unlock the client program 114 and all associated applications 116 simultaneously by entering a single user-selected client password in the user interface of the client program 114, which is more convenient for the user.

Thus, whenever started or restarted, each secure viewer/editor or the like application 116 requests its own "client password" or data or file access application key from the client program 114 in order to be able to unlock files stored in encrypted form in its own secure storage. This data access application key is generated by the client program 114 specifically for the application 116 and for example does not match the user-selected password which is used by the user to access the client program 114 itself. When the client program 114 first receives such a request from a given application 116 (for example when the application 116 is first launched or started on the computing device 100), it generates an application key for the application and may also store the key for future retrieval. If the client program 114 receives such a request and is already unlocked (i.e. is running and has already been opened using the user-selected password for the client program 114), it responds by sending the appropriate data access application key to the application 116. If it is not already unlocked, the client program 114 prompts the user to enter the user-selected password for the client program 114, and then, after entry of the correct user-selected password for the client program 114, responds to the application 116 with the data access application key for that application 116. The transmission of that data access application key is preferably encrypted, for example using the shared secret key of a Diffie-Hellman key exchange, including for example an elliptic curve Diffie-Hellman key exchange, or the public key of a public/private key pair.

Once the application 116 obtains its data access application key from the client program 114, the data access application key is used to derive a key that is used to encrypt/decrypt the master database key which is used to encrypt/decrypt data on the computing device 100. To restate this, for added security, the data on the computing device 100 is encrypted using a master database key, and that master database key is itself encrypted using the data access application key for the (or that particular) application 116 and stored in this encrypted form in a data store on the computing device 100 for the (or that particular) application 116. That encrypted master key can be accessed and decrypted by the application 116 using the data access application key as and when needed so that the application 116 can, in turn, then decrypt the data. The encryption for the data itself may use any suitable encryption technique. A particularly suitable example is AES-CBC (Advanced Encryption Standard cipher algorithm in Cipher Block Chaining mode) using for example a random 192 or 256 bit key as the master database key.

Since the application 116 is dependent on the client program 114 for the data access application key that unlocks its own local data store, it is preferred that the data access application key is not simply a string that is randomly generated by the client program 114 and stored only in the local database of the client program 114. If this were the case, then uninstallation/reinstallation of the client program 114 would typically result in a loss of access to all data previously stored with any such viewer/editor applications 116. Therefore, it is preferred that the data access application key be recoverable remotely and independently of the client device 100 and the client program 114 in particular.

A particularly useful way to achieve this is to make the data access application key recoverable from information that can be stored remotely from the client device 100. (A particularly suitable location is for example one of the enterprise servers 160,162,164 behind the firewall 170 mentioned above or some other remote data store.) In addition, since the data access application key is ideally recoverable in the case that a device record is deleted from the remote data store and then the client device 100 is re-provisioned, this data access application key information is preferably stored at the remote data store in records associated with a unique ID for the client device 100 and/or the enterprise user ID. Another factor that is preferably taken into account is that the application 116 may be first used at a time when the client program 114 is out of coverage of the NOC 140 or other remote data store (perhaps because no network connection for the client device 100 is available for example) and the client program 114 could be uninstalled before it subsequently comes back into coverage. Thus, recovery of the application 116 data access application key preferably does not depend on the ability of the client program 114 to synchronize information with the remote data store at any time other than when the client program 114 is initially activated or is reactivated.

In our US2013/0227280A1 (U.S. Ser. No. 13/780,283), the entire content of which is incorporated herein by reference, it was described that one way to meet these requirements for the data access application key, which is to be used by the application 116 to encrypt/decrypt the master database key which is used to encrypt/decrypt data on the computing device 100, is for the data access application key to be generated by the client program 114 from a combination of an application key that is specific to that client device 100 and/or the user of the client device 100 and an identifier of the particular application 116 concerned. However, there are situations where the identifier of the particular secure viewer/editor application or other application 116 concerned is not available to the client program 114 (at least, in a manner that is not easily spoofed) and so the data access application key cannot be generated securely in this way. It may be for example that the client program 114 cannot obtain the identifier of the particular application 116 from the operating system of the client device 100. A particular example of this occurs with the Windows 8 operating system by Microsoft Corporation. If for example the application 116 simply sends its own identifier to the control program 114, this cannot be trusted by the control program 114 as it is typically relatively straightforward for another application to spoof the identity of the application 116.

To address this, in accordance with one example of the present teachings the secure viewer/editor application or other application 116 generates a unique public/private key pair. The public/private key pair is stored outside the encrypted container. In the particular case of Windows 8, or more generally, the public/private key pair generated by the application 116 may for example be stored in the application's sandbox. (As is known per se, a "sandbox" in this context is a security mechanism which may be used to minimize the effect of malware or some untrusted or unknown software on a computing device. An application running in a sandbox operates in a restricted operating system environment and typically has limited permission to access other resources on the computing device. In the case of Windows 8 in particular, all Metro applications run in a sandboxed context known as the AppContainer.) The application 116 includes the public key in each request to the client program 114 for the data access application key and signs each request with the private key. The client program 114 then derives the data access application key, which it will return to the application 116, using the public key from the request sent by the application 116 plus other secret key material (examples of which will be discussed further below) that relates to the user and/or the user device 100 and that is known only to the client program 114.

A significant advantage of this is that, while meeting the desired objective of avoiding the user having to enter a password each time one of the applications 116 wants to access a file or data stored in encrypted form in a container on the computing device 100, it makes the data access application keys returned by the control program 114 unique to each requesting application 116 but without requiring an "application identifier" for the requesting application 116 to be supplied by the operating system of the computing device 100. As the private key is known only to the requesting application 116, the signing of the request for the data access application key with that private key by the requesting application 116 inhibits the ability of other applications running on the computing device 100 to spoof the request for the data access application key sent by the requesting application 116. It may be noted also that signatures on the request by the application 116 and the response by the control program 114 described here may also serve to "authenticate" the elliptic curve Diffie-Hellman or other key exchange discussed further below, so that the exchange is not vulnerable to "man-in-the-middle" attacks.

Figure 3:
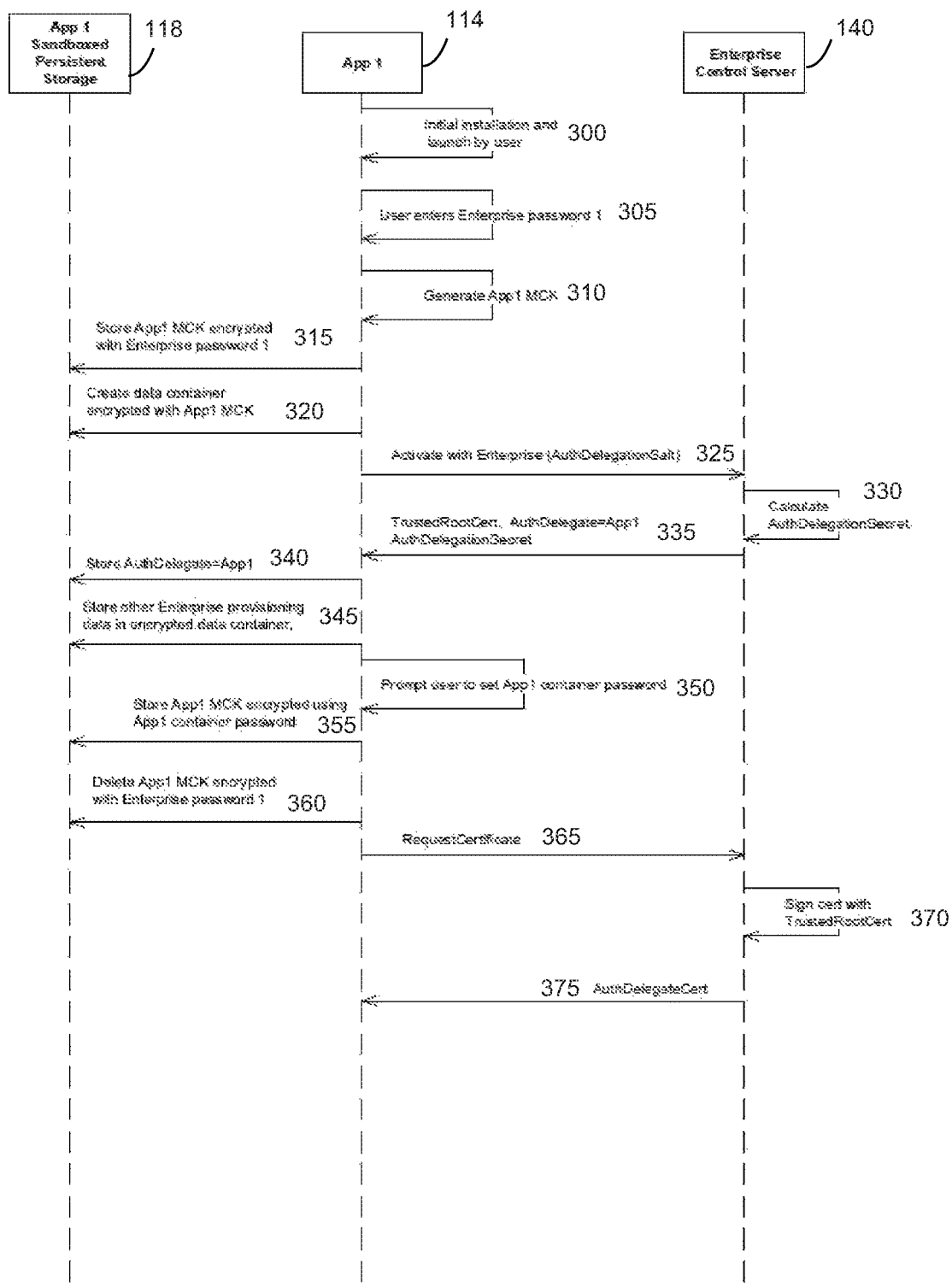
FIG. 3 shows schematically an example of activation of an application on a computing device that is to be an authentication delegate for other applications on the computing device.
Figure 4:
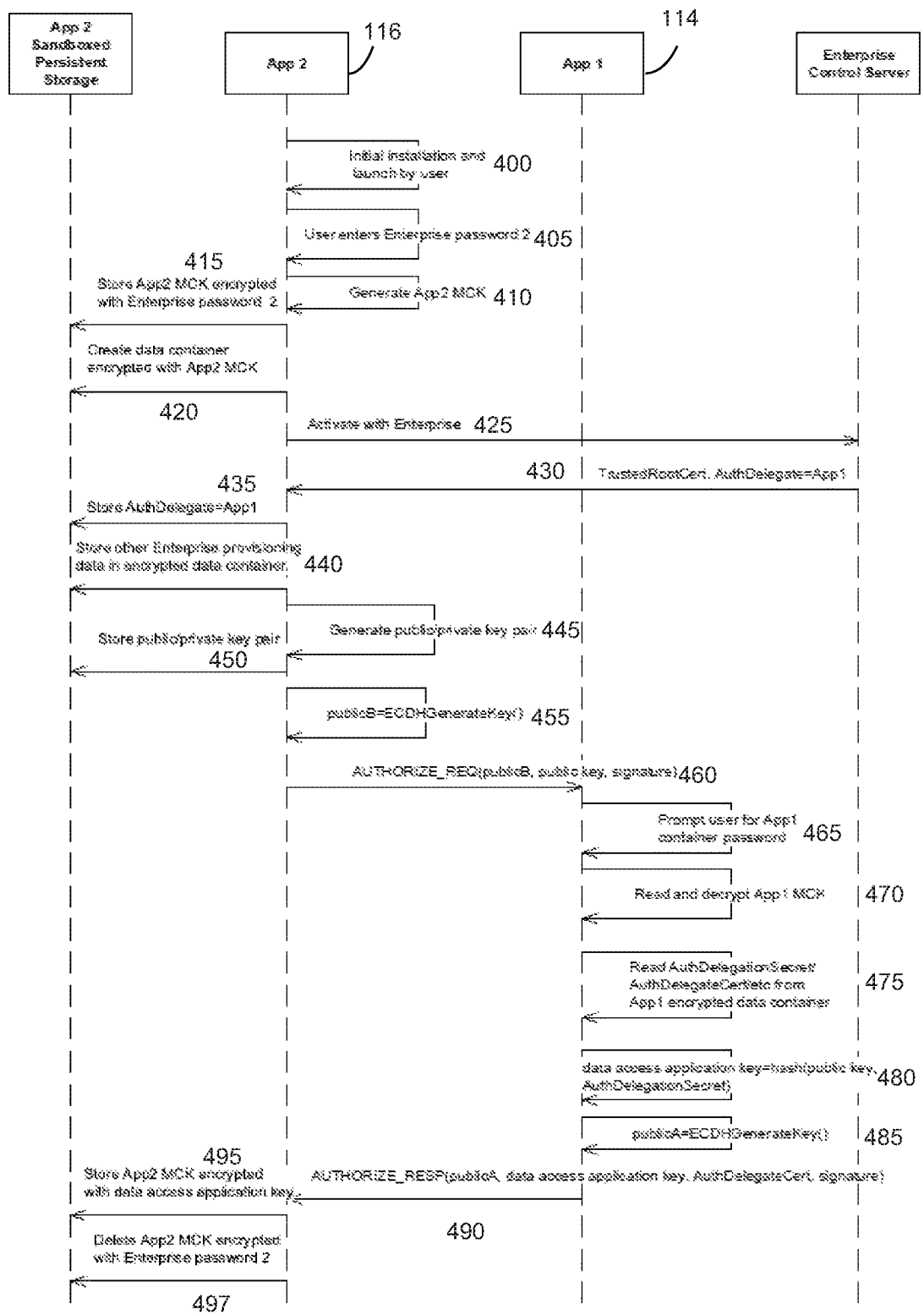
FIG. 4 shows schematically an example of activation of an application that delegates authorization to the authentication delegate application.
Figure 5:
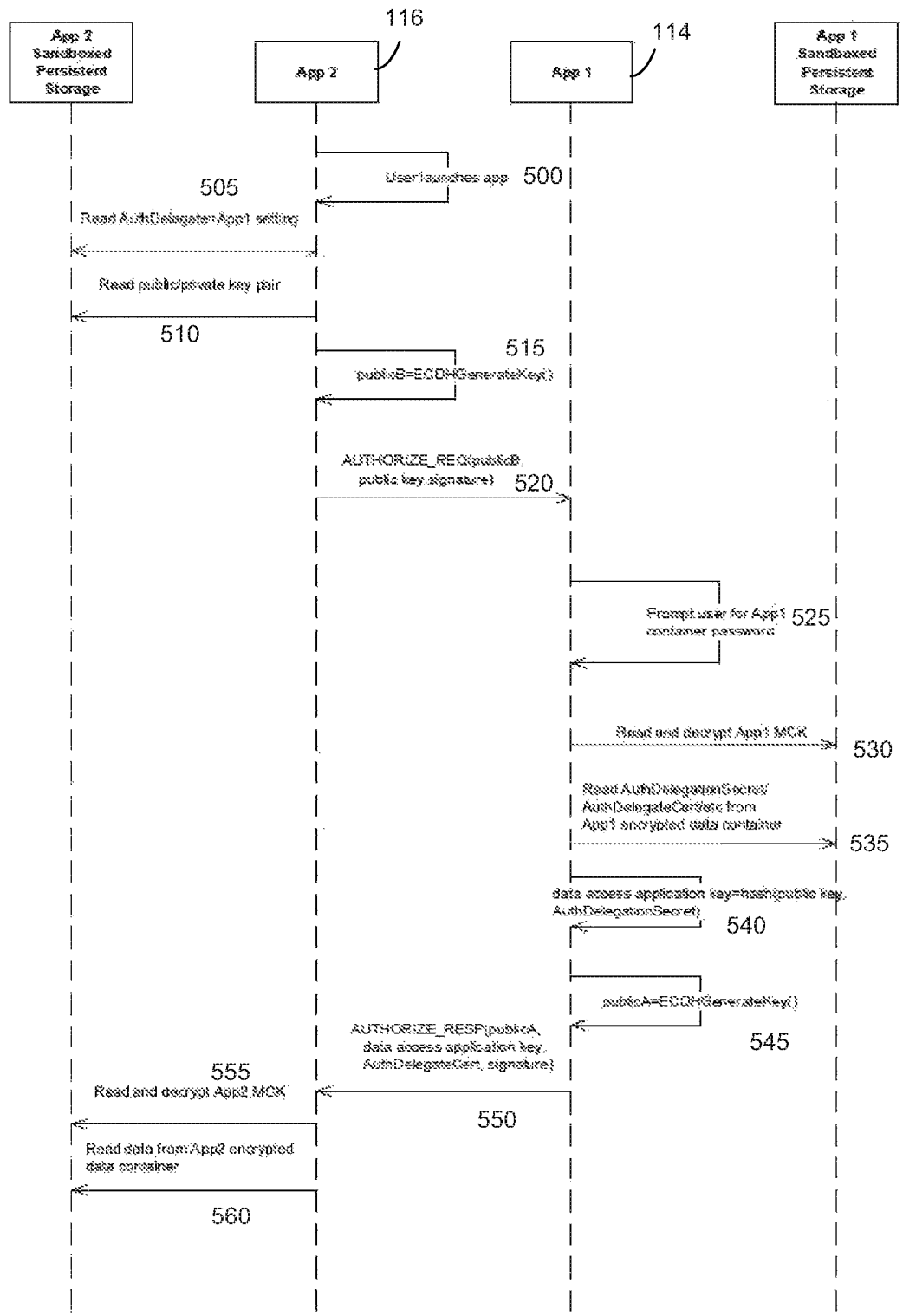
FIG. 5 shows schematically how an application is later unlocked after it has been terminated and then relaunched.

A specific detailed example of an embodiment of the present teachings will now be given with particular reference to FIGS. 3 to 5. FIG. 3 shows schematically an example of activation of an application 114 on the computing device 100 that is to be an authentication delegate for other applications 116 on the computing device 100; here the "application 114" that is to be an authentication delegate for other applications 116 corresponds generally to the "control program 114" described above and is also sometimes referred to herein as the "auth-delegate". FIG. 4 shows schematically an example of activation of an application 116 that delegates authorization to the first auth-delegate application 114. FIG. 5 shows schematically how an application 116 is later unlocked after it has been terminated and then relaunched or restarted.

Referring to FIG. 3, in a detailed specific example, the first application 114, which is to act as an authentication delegate for other applications 116 on the same computing device 100 and shown as App1 in FIG. 3, is installed and launched 300 by a user. The user then enters 305 an access code (i.e. a password) for the first application 114, this access code having been registered with or assigned by the enterprise with which the user is associated. The first application 114 then generates 310 a master container key (MCK) which is used to encrypt the data stored in the containers on the computing device 100. The master container key is stored 315 on the computing device 100, encrypted using the access code for the first application 114. A data container for the first application 114 is created 320 and encrypted with the master container key (MCK) for the first application 114. The encrypted master container key for the first application 114 and the data container for the first application 114 are stored in persistent storage on the computing device 100. In the case of Windows 8 in particular, or in general, this storage may be for example in the application's sandbox 118 on the computing device 100.

The first application 114 is activated 325 with the enterprise with which the user is associated. This may be achieved by the first application 114 transmitting 325 an authorization message (or a series of such messages) to a remote data store or enterprise control server (which may be the NOC 140 for example or some other server, such as one of the enterprise servers 160, 162, 164, as described above). This message or series of messages is authenticated using the access code for the first application 115 and includes a value (referred to as "AuthDelegationSalt" in the drawings) which is unique to the device 100 on which the first (authentication delegate) application 114 resides. To support the case where the first (authentication delegate) application 114 is uninstalled/reinstalled/reactivated after it has already started to act as the authentication delegate for another application 116, this AuthDelegationSalt is a value that persists across application uninstall/reinstall cycles. By way of example, in the particular case of Windows Phone 8, this value may be set equal to the HostInformation.PublisherHostId property. Other values may be used, with this or other operating systems. The enterprise control server 140, etc. then calculates 330 a value (referred to as "AuthDelegationSecret" in the drawings) which is then sent 335 to the first application 114.

The AuthDelegationSecret value may be a function of the AuthDelegationSalt value sent by the first application 114, a key associated with the particular user of the computing device 100 and stored by enterprise control server 140, etc., and an identifier of the first application 114. In one specific example, the key associated with the particular user of the computing device 100 is a randomly generated 256-bit key, referred to here as the "User-Key". The AuthDelegationSecret for a given container in one specific example may then be derived as follows:

Device-User-Key=HMAC-SHA512(User-Key,AuthDelegationSalt)

AuthDelegationSecret=PBKDF2(PRF=HMACSHA512,$P$=Device-User-Key,$S$=applicationID, $c$=1000,$dk$Len=32)

where HMAC is a known keyed-Hash Message Authentication Code which uses a cryptographic hash function to calculate a message authentication code; PBKDF2 (Password-Based Key Derivation Function 2) is a known key derivation function for generating a cryptographic key; and applicationID is the identifier of the first application 114, to which the AuthDelegationSecret is sent at 335.

The first application 114 stores 340 data indicating that the first application 114 is to be the authentication delegate for other applications 116. Other data may be stored 345 in encrypted form in a container, including in particular the AuthDelegationSecret for the first application 114. In the case of Windows 8 in particular, or in general, this storage may be for example in the application's sandbox 118 on the computing device 100.

Continuing with this initial activation stage, the user is then prompted 350 to enter a password for the container of the first application 114. The master container key (MCK), which is used to encrypt the data stored in the containers on the computing device 100, is saved 355 in persistent storage on the computing device 100, again optionally in the application's sandbox 118, in encrypted form using the container password entered by the user at 350. The master container key stored at 315 on the computing device 100 encrypted using the access code for the first application 114 is deleted 360. FIG. 3 finally shows steps 365, 370, 375 relating to obtaining a certificate corresponding to a private key that the first application 114 will use in order to sign messages sent to data access application 116 in response to requests for a data access application key.

Referring now to FIG. 4, this shows schematically a detailed specific example of activation of an application 116 (shown as App2 in FIG. 4) that delegates authorization to the first, auth-delegate, application 114 (shown as App1 in FIG. 4). The second application 116 is installed and launched 400 by a user. The user then enters 405 an access code (i.e. a password) for the second application 116, this access code having been registered with or assigned by the enterprise with which the user is associated. The second application 116 then generates 410 a master container key (MCK) which is used to encrypt the data stored in the container on the computing device 100. The master key is stored 415 on the computing device 100, encrypted using the access code for the second application 116. A data container for the second application 116 is created 420 and encrypted with the master container key (MCK) for the second application 116. The encrypted master container key for the second application 116 and the data container for the second application 116 are stored in persistent storage on the computing device 100. In the case of Windows 8 in particular, or in general, this storage may be for example in the application's sandbox 118 on the computing device 100.

The second application 116 is activated 425 with the enterprise with which the user is associated. This may be achieved by the second application 116 transmitting 425 an authorization message or series of such messages to a remote data store or enterprise control server (which may be the NOC 140 for example or some other server, such as one of the enterprise servers 160, 162, 164, as described above), the message or messages being authenticated using the access key. An activation response message is returned 430 by the server indicating inter alia that the first application 114 is to be the authentication delegate for the second application 116, this being stored 435 by the second application 116. Other data may be stored 440 in encrypted form in a container. In the case of Windows 8 in particular, or in general, this storage may be for example in the application's sandbox 118 on the computing device 100.

The second application 116 generates 445 a public/private key pair. The public/private key pair is stored outside the encrypted container. In the particular case of Windows 8, or more generally, the public/private key pair generated by the second application 116 may for example be stored 450 in the application's sandbox. A public key publicB for a DiffieHellman key exchange may be generated 455 by the second application 116.

The second application 116 then sends 460 a connection request AUTHORIZE_REQ to the first application 114. The connection request includes importantly the public key generated by the second application 116, and includes a signature calculated by the second application 116 using the private key as the signature key and some or all of the other request parameters as the data to be signed. The connection request may also include the public key publicB for the Diffie-Hellman key exchange mentioned above, in which case the public key publicB is included in the calculation of the request signature.

Upon receipt of the connection request AUTHORIZE_REQ, the first application 114 checks that the signature of the request is valid for the supplied public key and the other request data. If validation fails the request is rejected. Otherwise, the first application 114 prompts 465 the user for the password for the container of the first application 114 which was entered at 350 above. When the password has been correctly entered, the first application 114 reads and decrypts 470 the master container key for the first application 114 which was stored in encrypted form at 355 above. Then, the first application 114 reads 475 the AuthDelegationSecret which was stored by the first application 114 in the container for the first application at 345 above. The first application 114 then calculates 480 a data access application key, which will be used by the second application 116 to encrypt and decrypt the master container key which is to be used to access encrypted files or data on the computing device 100. The first application 114 may also generate 485 a public key publicA for a Diffie-Hellman key exchange, to be used with the public key publicB Diffie-Hellman key exchange data mentioned above.

The data access application key is a function of an identifier of the second application 116. In this detailed example discussed here, the identifier of the second application 116 may be the public key generated by the second application 116 and sent by the second application 116 at 460 mentioned above. The data access application key may also be a function of the AuthDelegationSecret which was stored by the first application 114 in the container for the first application 114 at 345 above. In one specific example, the data access application key sent to the second application 116 which is requesting authentication delegation may be calculated as follows:

data access application key=PBKDF2(PRF=HMAC-SHA512,$P$=AuthDelegationSecret,$S$=requesting-container-identifier,$c$=1000,$dk$Len=32)

where HMAC and PBKDF2 are as described above and the requesting-container-identifier is the public key sent by the second application 116 at 460 in the connection request AUTHORIZE_REQ.

The first application 114 then sends 490 a response message AUTHORIZE_RESP to the second application 116. The response message includes the data access application key in encrypted form, a certificate AuthDelegateCert for the first application 114 containing a public key, and a signature calculated using the private key corresponding to the public key included in the certificate AuthDelegateCert as the signature key and some or all of the other response parameters as the data to be signed. The response message also includes the public key publicA for a Diffie-Hellman key exchange if used, in which case the key used to encrypt the data access application key is the shared key derived from the Diffie-Hellman key exchange and the public key publicA is included in the calculation of the message signature.

Upon receipt of the response message sent at 490, the second application 116 checks that the AuthDelegateCert included in the response message is signed with a valid certificate chain that ends with the TrustedRootCert that it received from the enterprise control server 140 in the activation response 430 and that the certificate subject matches the user identifier that it received from the enterprise control server 140 in the activation response 430. The second application 116 also checks that the signature included in the response message request is valid for the supplied AuthDelegateCert and the other request data. If either of these checks fail, the response message is dropped and the authentication delegation request is considered to have failed. Otherwise, the second application 116 decrypts the data access application key received in the request and then stores 495 the master container key (MCK) in encrypted form using the data access application key, and deletes 497 the master container key (MCK) which had been stored at 415 in encrypted form using the access code for the second application 116.

In this way, the second application 116 (and other applications) is able to use the first application 114 as an authentication delegate when wanting to access data or files that are saved in a secure manner on the computing device 100 without requiring the user to have to enter a password for the second or other applications 116 each time. This can be achieved even in the case that an application identifier for the second or other applications 116 is not available to the first application 114 from the operating system of the computing device 100, such as occurs with for example Windows 8.

Referring now to FIG. 5, this shows schematically a detailed specific example of how an application 116, which is a "second" application that delegates authorization to the first, auth-delegate, application 114) may be later unlocked after it has been terminated and then relaunched or restarted. At 500, the user launches or starts the second application 116. The second application 116 reads the data "AuthDelegate=App1" indicating that the first application 114 is to be the authentication delegate for other applications 116 which was stored at 340 above. The second application 116 also reads 510 the public/private key pair from the associated persistent storage on the computing device 100, which, in the example of Windows 8, is in the sandbox for the second application 116.

A public key publicB for a Diffie-Hellman key exchange may be generated 515 by the second application 116. The second application 116 then sends 520 a connection request AUTHORIZE_REQ to the first application 114. The connection request includes the public key generated by the second application 116, and includes a signature calculated by the second application 116 using the private key as the signature key and some or all of the other request parameters as the data to be signed. The connection request may also include the public key publicB for the Diffie-Hellman key exchange mentioned above, in which case the public key publicB is included in the calculation of the request signature.

Upon receipt of the connection request AUTHORIZE_REQ, the first application 114 checks that the signature of the request is valid for the supplied public key and the other request data. If validation fails the request is rejected. Otherwise, the first application 114 prompts 525 the user for the password for the container of the first application 114 which was entered at 350 above. When the password has been correctly entered, the first application 114 reads and decrypts 530 the master container key for the first application 114 which was stored in encrypted form at 355 above. Then, the first application 114 reads 535 the AuthDelegationSecret which was stored by the first application 114 in the container for the first application at 345 above. The first application 114 then calculates 540 the data access application key, which will be used by the second application 116 to encrypt and decrypt the master container key which is to be used to access encrypted files or data on the computing device 100; the data access application key may be calculated using a hash function as described above. The first application 114 may also generate 545 a public key publicA for a Diffie-Hellman key exchange, to be used with the public key publicB Diffie-Hellman key exchange data mentioned above.

The first application then sends 550 a response message AUTHORIZE_RESP to the second application 116. The response message includes the data access application key in encrypted form, a certificate AuthDelegateCert for the first application 114 containing a public key, and a signature which uses the private key corresponding to the public key included in the certificate AuthDelegateCert as the signature key and some or all of the other response parameters as the data to be signed. The response message also includes the public key publicA for a Diffie-Hellman key exchange if used, in which case the key used to encrypt the data access application key is the shared key derived from the Diffie-Hellman key exchange and the public key publicA is included in the calculation of the message signature. Upon receipt of the response message sent at 550, the second application 116 decrypts the data access application key received in the request and is therefore able to read and decrypt 555 the master container key (MCK) which was stored in encrypted form using the data access application key, and therefore read 560 data that was stored in encrypted form using the master container key (MCK).

As mentioned above, the computing device 100 may include multiple authentication-requesting applications 116, and the first application 114 may act as an authentication delegate for each of these applications. The data access application key for each application 116 may be different, each data access application key being used to encrypt different instances of the master database key. Similarly, the public/private key pair for each authentication-requesting application 116 may be different.

Figure 6:
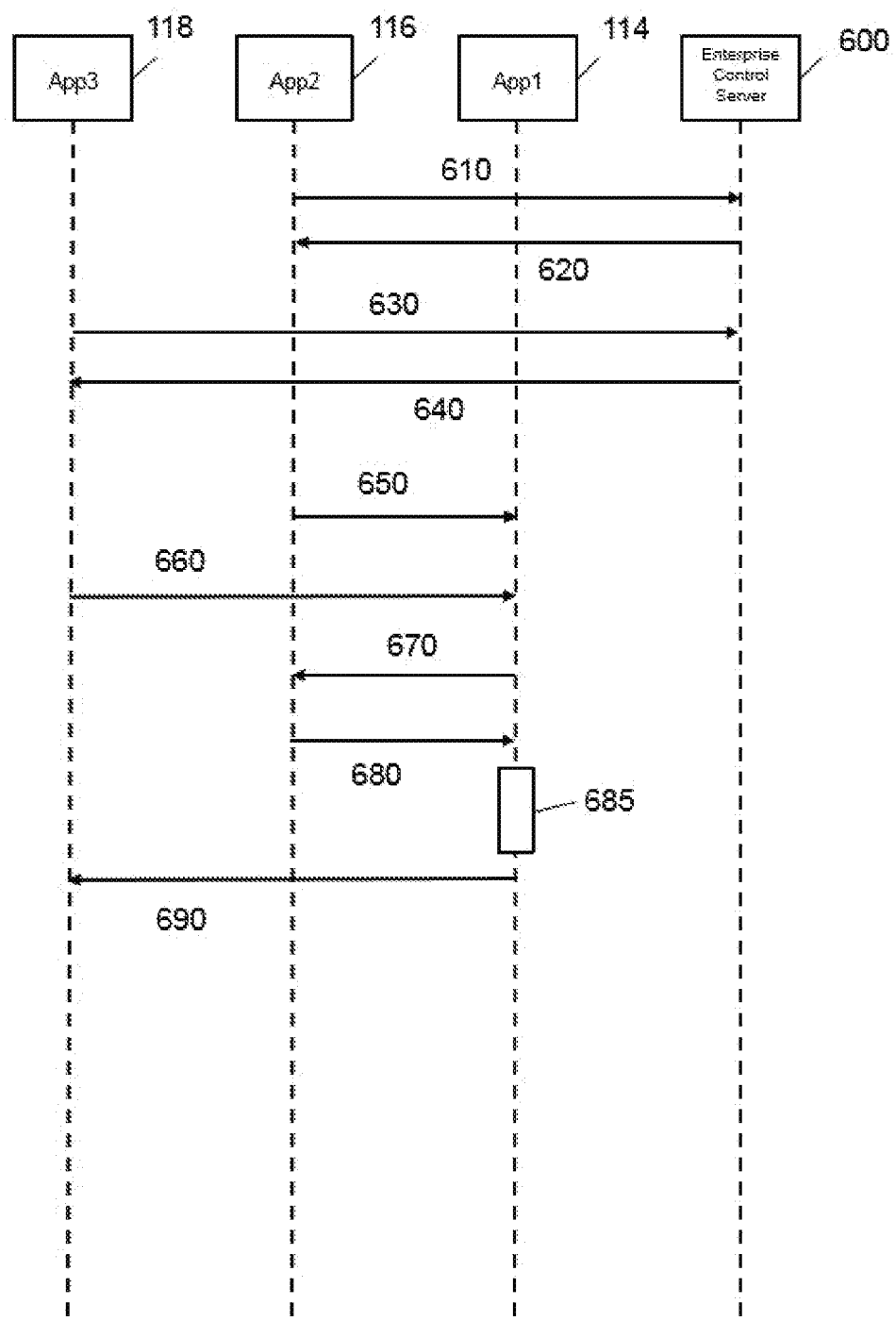
FIG. 6 shows schematically an example of an application acting as authentication delegate for two other applications.

Referring now to FIG. 6, this shows schematically a specific embodiment in which the first application 114 acts as an authentication delegate for two (or more) applications. FIG. 6 shows the first application 114 on the same computing device 100 as described in the previous example shown as App1 in FIG. 6. The first application 114 is activated with respect to an enterprise control server 600 in a manner as previously described in relation to FIG. 3. More generally, activation with respect to a remote device by the first application 114 proceeds as described in US patent application US2015/0334105A1 (U.S. Ser. No. 13/812,756) incorporated herein by reference in its entirety. With reference to FIG. 6, at some later point in time (shown as step 610) the second application 116 sends an activation request message to the enterprise server 600. A response message is returned 620 by the server 600 indicating inter alia that the first application 114 is to be the authentication delegate for the second application 116. Similarly a third application 118 may send an activation request message to the enterprise server 600 at step 630, in which case the server 600 responds with a message that the first application 114 is to act as authentication delegate for the third application 118.

Subsequently, the first application 114 is invoked by the user, causing the first application 114 to prompt the user to enter their credentials. While waiting for the user to enter their credentials the first application 114 may receive a first message from the second application (step 650), for a first authentication response. According to an example, the first message from the second application for a first authentication response comprises a connection request message AUTHORIZE_REQ which also includes a public key generated by the second application as previously described. Similarly, the first application 114 may receive a second message (step 660) from the third application 118 for a second application response. In response, and because the first application 114 has a pending request for an authentication response from the third application 118 in addition to one from the second application 116, the first application 114 sends a response to the first request (step 670), which comprises specific control data, together with authentication data, to the second application 116. According to an example, the authentication data comprises the data access application key, a certificate AuthDelegateCert for the first application 114 containing a public key, and a signature calculated using the private key corresponding to the public key included in the certificate AuthDelegateCert as the signature key and some or all of the other response parameters as the data to be signed.

The control data contained within the response to the first request is configured to be parsed by the second application 116, such that the second application 116 can generate a further message containing specific information that causes the operating system to provide access to foreground processing resources to the first application 114 so that it can to service the second message (sent at step 660) from the third application. Once the first application 114 has access to foreground resources, it may send a message to the third application 118. Thus, on the basis of data contained in a further message sent between the second application and first application (step 680), the first application 114 is arranged to invoke foreground processing resources (step 685) in order to service the second message received from the third application.

In one arrangement the first application 114 is configured to queue authentication requests that are received, from different applications 116, 118, between the step of receiving a first authentication request message (in this example from the second application 116) and the step of the user entering the required credentials. According to an example, the control data comprises a flag "returnFocus". Further, the content of the control data, in this example the value of the flag "returnFocus", is dependent on the number of pending requests that the first application 114 has received at the point at which the user's credentials are validated: if only one request is pending the flag takes value 0 and if more than one request is pending the flag takes value 1. In response to receipt of a value of 1 for this flag "returnFocus", the second application 116 includes, in the further message, an instruction that will be interpreted by the operating system to provide foreground processing resources to the first application 114.

It will be appreciated that, while this example involves two applications (116, 118) configured to request authentication data to enable decryption of data that is stored in encrypted form on the computing device via the first application 114 acting as authentication delegate, the method applies to any number of requesting applications.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computing device, comprising:
a memory; and
at least one hardware processor communicatively coupled with the memory and configured to:
receive, at a first application and from a second application, a request requesting the first application to send the second application a data access application key, wherein both the first application and the second application execute on the computing device, the first application is different than the second application, the second application generates a public/private key pair including a public key and a private key, and the request includes the public key;
derive, at the first application, the requested data access application key as a function of at least the public key; and
send, from the first application to the second application, the derived data access application key, wherein the second application uses the derived data access application key to decrypt data that is stored in an encrypted form on the computing device.

2. The computing device according to claim 1, wherein the request sent by the second application to the first application includes a signature which is signed with the private key.

3. The computing device according to claim 1, wherein the first application derives the requested data access application key as a function of at least the public key and a value that is unique to the computing device.

4. The computing device according to claim 1, wherein the first application derives the requested data access application key as a function of at least the public key and a key associated with a user of the computing device.

5. The computing device according to claim 1, wherein the first application derives the requested data access application key as a function of at least the public key and an identifier of the first application.

6. The computing device according to claim 1, wherein the first application derives the requested data access application key as a function of at least the public key, a value that is unique to the computing device, a key associated with a user of the computing device and an identifier of the first application.

7. The computing device according to claim 1, wherein the second application saves the public/private key pair in a sandbox associated with the second application on the computing device.

8. The computing device according to claim 1, wherein the data access application key is used by the second application to encrypt and decrypt a key that is used to encrypt data stored by the second application.

9. The computing device according to claim 1, wherein the at least one hardware processor is further configured to:
receive, at the first application and from a third application, a further request requesting the first application to send the third application a further data access application key, wherein the third application generates a further public/private key pair including a further public key and a further private key, the further request includes the further public key, the third application executes on the computing device, and the third application is different than the first application and the second application;
derive, at the first application, the further data access application key as a function of at least the further public key; and
send, from the first application to the third application, the further data access application key, wherein the third application uses the further data access application key to decrypt further data that is stored in a further encrypted form on the computing device.

10. The computing device according to claim 9, wherein the at least one hardware processor is further configured to:
determine, by the first application, whether the further request from the third application is pending prior to the first application sending a message comprising the derived data access application key and control data to the second application, and in case that the further request from the third application is pending:
send, from the first application to the second application, the message comprising the derived data access application key and the control data; and
responsive to sending the message, receive, at the first application and from the second application, a further message for the first application to process the pending further request from the third application based on the control data.

11. A method of operating a computing device, the method comprising:
receiving, at a first application and from a second application, a request requesting the first application to send the second application a data access application key, wherein both the first application and the second application execute on the computing device, the first application is different than the second application, the second application generates a public/private key pair including a public key and a private key, and the request includes the public key;
deriving, at the first application, the requested data access application key as a function of at least the public key; and
sending, from the first application to the second application, the derived data access application key, wherein the second application uses the derived data access application key to decrypt data that is stored in an encrypted form on the computing device.

12. The method according to claim 11, wherein the request sent by the second application to the first application includes a signature which is signed with the private key.

13. The method according to claim 11, wherein the first application derives the requested data access application key as a function of at least the public key and a value that is unique to the computing device.

14. The method according to claim 11, wherein the first application derives the requested data access application key as a function of at least the public key and a key associated with a user of the computing device.

15. The method according to claim 11, wherein the first application derives the requested data access application key as a function of at least the public key and an identifier of the first application.

16. The method according to claim 11, wherein the first application derives the requested data access application key as a function of at least the public key, a value that is unique to the computing device, a key associated with a user of the computing device and an identifier of the first application.

17. The method according to claim 11, wherein the second application saves the public/private key pair in a sandbox associated with the second application on the computing device.

18. The method according to claim 11, wherein the data access application key is used by the second application to encrypt and decrypt a key that is used to encrypt data stored by the second application.

19. The method according to claim 11, further comprising:
receiving, at the first application and from a third application, a further request requesting the first application to send the third application a further data access application key, wherein the third application generates a further public/private key pair including a further public key and a further private key, the further request includes the further public key, the third application executes on the computing device, and the third application is different than the first application and the second application;
deriving, at the first application, the further data access application key as a function of at least the further public key; and
sending, from the first application to the third application, the further data access application key, wherein the third application uses the further data access application key to decrypt further data that is stored in a further encrypted form on the computing device.

20. The method according to claim 19, further comprising:
determining, by the first application, whether the further request from the third application is pending prior to the first application sending a message comprising the derived data access application key and control data to the second application, and in case that the further request from the third application is pending:
sending, from the first application to the second application, the message comprising the derived data access application key and the control data; and
responsive to sending the message, receiving, at the first application and from the second application, a further message for the first application to process the pending further request from the third application based on the control data.

21. A non-transitory computer-readable medium containing instructions which, when executed, cause a computing device to perform operations comprising:
receiving, at a first application and from a second application, a request requesting the first application to send the second application a data access application key, wherein both the first application and the second application execute on the computing device, the first application is different than the second application, the second application generates a public/private key pair including a public key and a private key, and the request includes the public key;
deriving, at the first application, the requested data access application key as a function of at least the public key; and
sending, from the first application to the second application, the derived data access application key, wherein the second application uses the derived data access application key to decrypt data that is stored in an encrypted form on the computing device.

22. The non-transitory computer-readable medium according to claim 21, wherein the request sent by the second application to the first application includes a signature which is signed with the private key.

23. The non-transitory computer-readable medium according to claim 21, wherein the first application derives the requested data access application key as a function of at least the public key and a value that is unique to the computing device.

24. The non-transitory computer-readable medium according to claim 21, wherein the first application derives the requested data access application key as a function of at least the public key and a key associated with a user of the computing device.

25. The non-transitory computer-readable medium according to claim 21, wherein the first application derives the requested data access application key as a function of at least the public key and an identifier of the first application.

26. The non-transitory computer-readable medium according to claim 21, wherein the first application derives the requested data access application key as a function of at least the public key, a value that is unique to the computing device, a key associated with a user of the computing device and an identifier of the first application.

27. The non-transitory computer-readable medium according to claim 21, wherein the second application saves the public/private key pair in a sandbox associated with the second application on the computing device.

28. The non-transitory computer-readable medium according to claim 21, wherein the data access application key is used by the second application to encrypt and decrypt a key that is used to encrypt data stored by the second application.

29. The non-transitory computer-readable medium according to claim 21, wherein the operations further comprise:
receiving, at the first application and from a third application, a further request requesting the first application to send the third application a further data access application key, wherein the third application generates a further public/private key pair including a further public key and a further private key, the further request includes the further public key, the third application executes on the computing device, and the third application is different than the first application and the second application;
deriving, at the first application, the further data access application key as a function of at least the further public key; and
sending, from the first application to the third application, the further data access application key, wherein the third application uses the further data access application key to decrypt further data that is stored in a further encrypted form on the computing device.

30. The non-transitory computer-readable medium according to claim 29, wherein the operations further comprise:
determining, by the first application, whether the further request from the third application is pending prior to the first application sending a message comprising the derived data access application key and control data to the second application, and in case that the further request from the third application is pending:
sending, from the first application to the second application, the message comprising the derived data access application key and the control data; and responsive to sending the message, receiving, at the first application and from the second application, a further message for the first application to process the pending further request from the third application based on the control data.

\* \* \* \* \*